W. VOGEL.
GRIDDLE CAKE TURNER.
APPLICATION FILED SEPT. 23, 1915.
1,203,665.
Patented Nov. 7, 1916.
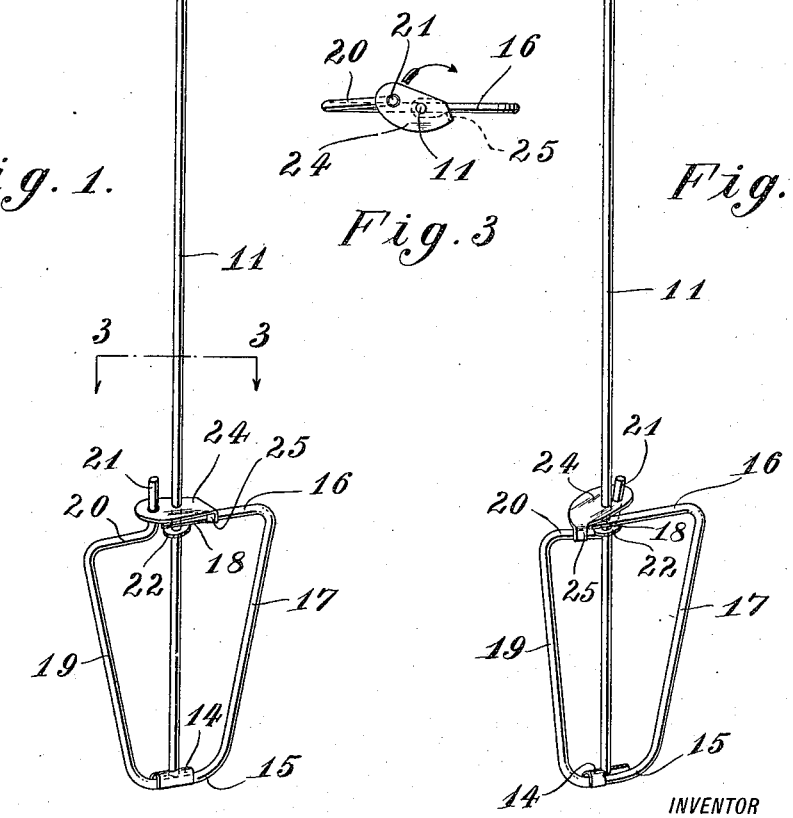
INVENTOR
William Vogel.
BY Oscar Geier
ATTORNEY

UNITED STATES PATENT OFFICE.

WILLIAM VOGEL, OF NEW YORK, N. Y.

GRIDDLE-CAKE TURNER.

1,203,665.

Specification of Letters Patent.

Patented Nov. 7, 1916.

Application filed September 23, 1915. Serial No. 52,160.

*To all whom it may concern:*

Be it known that I, WILLIAM VOGEL, a citizen of the United States, and resident of New York, in the county of New York and State of New York, have invented certain new and useful Improvements in Griddle-Cake Turners, of which the following is a specification.

This invention relates to improvements in culinary utensils and particularly to such devices as are used in turning partially baked articles, from one side to the other during the baking process, and with special reference to thin, flat articles composed of dough and commonly known as griddle cakes.

The main object of the invention is to provide an efficient device, convenient and handy for accomplishing the purpose, well adapted to be used by inexperienced operators with certainty and celerity.

Another object is to provide a cheaply made device, of few and simple parts, capable of long and continuous service without getting out of order.

These objects are attained by the novel construction and combination of parts, hereafter described and shown in the accompanying drawing, but it is to be understood that modifications and variations may be made from the exact structure indicated without departing from the scope of the claim hereto made.

In the drawing, Figure 1 is a perspective view of a griddle cake turner, made in accordance with the invention, shown in its normal position, ready for use. Fig. 2 is a similar perspective view of the same, but shown in a reversed position with reference to the blade, and, Fig. 3 is a transverse sectional view, taken on line 3—3 of Fig. 1.

The utensil is composed of a very thin, flat blade 10, having considerable area so as to afford a substantial support to the article to be turned, so that it may not become broken in the process of turning; this blade is preferably made of sheet metal, protected by well known means from corrosion arising from moisture and contact with the articles turned, and is provided with a relatively long, slim stem 11, rigidly united to it and formed with an angular bend 12 close to the plate in order that it may be conveniently operated.

The opposite end of the stem 11 is revolubly mounted in a saddle 14 rigidly secured to the curved end 15 of the wire handle, which presents, in profile, a triangular shape, suited to be received in the hand and comprised of a single resilient wire, one end 16 of which is flattened and pierced to allow the stem 11 to pass through, forming in effect a bearing 18 for it; then, after continuing out for a short distance, the wire is bent inwardly, as at 17, to the curved portion 15, which is continued on the opposite side 19, to the in-turned member 20, which is substantially in the same plane as the member 16, forming with it the base of the mentioned triangular handle and ending in an upturned stub portion 21, practically parallel with the stem 11.

Secured below the bearing 18, rigidly on the stem 11, is a collar 22 which prevents the stem from rising out of the bearing in the saddle 14, and on the opposite side of the bearing 18 is a plate 24 having an opening through which extends the stub end 21 of the handle in such manner that when the sides 17 and 19 are pressed together, the plate 24 is caused to rotate, carrying the stem and plate with it, as indicated by the arrow shown in Fig. 3; upon relaxing pressure upon the handle the side 19 will spring out, carrying the plate with it until the stop 25, formed integrally with the plate 24, comes in contact with the end 16 of the handle, arresting further motion and leaving the stub end 21 a little to one side of the center of the stem 11 so that it will readily move partially around it when pressure is applied.

In operation, the blade 10 is entered under the article to be turned, as nearly under the center as possible, and the handles pressed together, whereupon the turning is performed without spilling or slopping and instantaneously if the handles be quickly operated.

Having thus described the invention, what I claim as new and seek to secure by Letters Patent, is:—

In a griddle cake turner, the combination with a blade and a stem attached thereto, of a handle comprised of a single strand of round wire forming a substantially triangular loop, one side being resiliently movable, and having an upturned end parallel with said stem, a saddle forming a foot bearing for said stem at the apex end of said loop, a second bearing at the end of the handle wire, means for maintaining said stem in its bearings, a perforated crank rigidly secured to said stem beyond the second bearing, a limit stop formed therewith and a connection between the end of the movable side of the handle loop and the perforation in said crank whereby the latter may be partially rotated by compressing the handle loop.

Signed at New York, in the county of New York and State of New York, September, A. D. 1915.

WILLIAM VOGEL.

Witnesses:
F. J. NEKARDA,
L. A. KOHLMANN.

Copies of this patent may be obtained for five cents each, by addressing the "Commissioner of Patents, Washington, D. C."